United States Patent [19]
Reber

[11] 3,948,028
[45] Apr. 6, 1976

[54] HAY-MAKING MACHINE
[76] Inventor: Walter Reber, 50, avenue du Marechal Foch, Saverne (Bas-Rhin), France
[22] Filed: May 14, 1974
[21] Appl. No.: 469,787

[30] Foreign Application Priority Data
May 23, 1973 France .............................. 73.19592

[52] U.S. Cl. .................................... 56/365; 56/370
[51] Int. Cl.² ......................................... A01D 81/00
[58] Field of Search ............. 56/370, 377, 365, 366, 56/367

[56] References Cited
UNITED STATES PATENTS
3,820,314  6/1974  Reber .................................. 56/370
3,827,224  8/1974  Mulder et al. ......................... 56/370

FOREIGN PATENTS OR APPLICATIONS
1,228,808  4/1971  United Kingdom .................. 56/370

Primary Examiner—Louis G. Mancene
Assistant Examiner—J. N. Eskovitz
Attorney, Agent, or Firm—Young & Thompson

[57] ABSTRACT

The disclosure is of an agricultural hay-making machine for both tedding and windrowing, comprising at least two rotors, means mounting said rotors on said machine for rotation, each rotor comprising tool-carrier arms articulatedly connected to cranks which cranks are articulatedly connected between an annular support and push-rods, the push-rods being articulatedly connected to a hub for transposition of the annular support and the tool-carrier arms between two positions of which one is a low swathing position and the other is a higher tedding position.

21 Claims, 14 Drawing Figures

HAY-MAKING MACHINE

INTRODUCTION AND BACKGROUND OF THE INVENTION

The present invention relates to agricultural machines in the form of multi-purpose hay-making machines for both tedding and windrowing, comprising at least two rotors each driven in rotation about an axis which is preferably inclined forwards in the direction of travel during tedding, at an acute angle to the ground, each rotor being provided especially with arms carrying working tools in the form of tines for shifting the cut crop.

In particular this invention concerns a machine on which the working tools occupy, when they are close to the ground at the front for tedding, a position closer to a perpendicular position in relation to the ground than to a position parallel with the ground, and on which for windrowing the working tools are transposed into a position in which they are further inclined in relation to the ground than in their tedding position and are oriented towards the direction opposite to the direction of rotation of their respective rotors, the trajectories described by the working tools being reduced by the said transposition.

The purpose of this invention is to obtain a combined machine which effectively permit of carrying out simultaneously a tedding and windrowing work of very good quality, while being of reliable operation and especially of practical utilisation.

BRIEF SUMMARY OF THE INVENTION

According to the invention there is provided an agricultural hay-making machine for both tedding and windrowing, comprising at least two rotors, means mounting said rotors on said machine for rotation, each rotor comprising tool-carrier arms articulatedly connected to cranks which cranks are articulatedly connected between an annular support and push-rods, the push-rods being articulatedly connected to a hub for transposition of the annular support and the tool-carrier arms between two positions of which one is a low swathing position and the other is a higher tedding position

FURTHER DESCRIPTION AND ADVANTAGES OF THE INVENTION

The new means proposed to attain this object and the advantages conferred by these means will appear from the following description with reference to the accompanying drawings which represent by way of non-limitative example two forms of embodiment in accordance with the invention.

BRIEF DESCRIPTION OF THE VIEWS IN THE DRAWINGS

In the drawings:-

FIG. 2 represents a partial profile view of the rotor according to FIG. 1 in the swathing position, FIG. 6 represents a profile view, on a larger scale of a working tool and its adjacent parts, in a tedding position, FIG. 7 represents a plan view of the elements according to FIG. 6, FIG. 8 represents a profile view of a working tool and its adjacent parts in the swathing position, FIG. 9 represents a plan view of the elements of FIG. 8, FIG. 10 represents a partial rear view of a rotor in the swathing position, FIG. 11 represents a profile view of a working tool and its adjacent parts in the tedding position, FIG. 12 represents a partial sectional profile view of the regulating device for the rotors, FIG. 13 represents a variant of the annular support in partial plan view, FIG. 14 represents a second variant of the annular support in partial plan view.

DETAILED DESCRIPTION OF THE PREFERRED EMBODIMENTS

Figure 3:
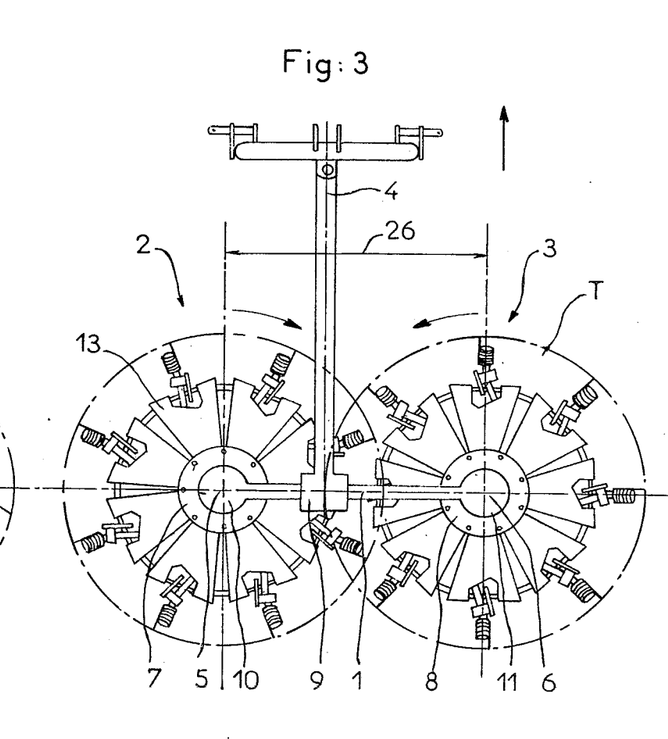
FIG. 3 represents a partial plan view of a two-rotor machine in the tedding position.
Figure 4:
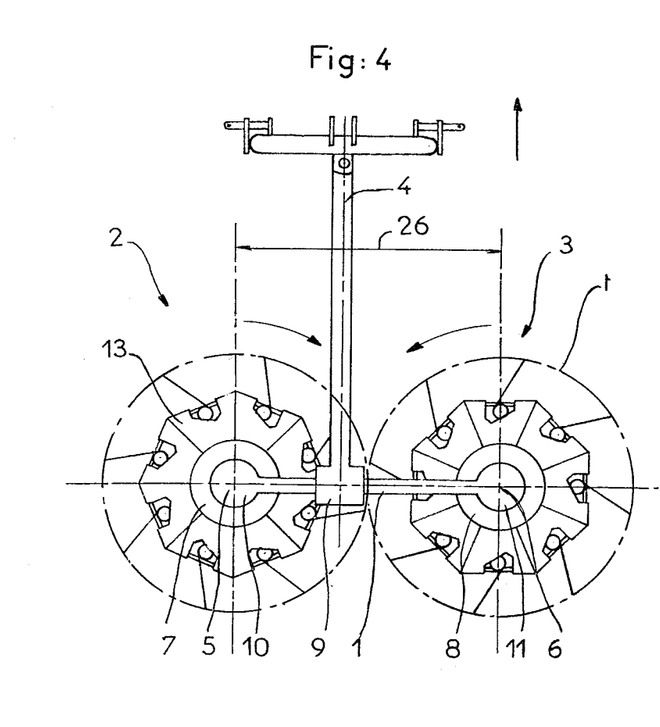
FIG. 4 represents a partial plan view of a machine according to FIG. 3 in the swathing position.
Figure 5:
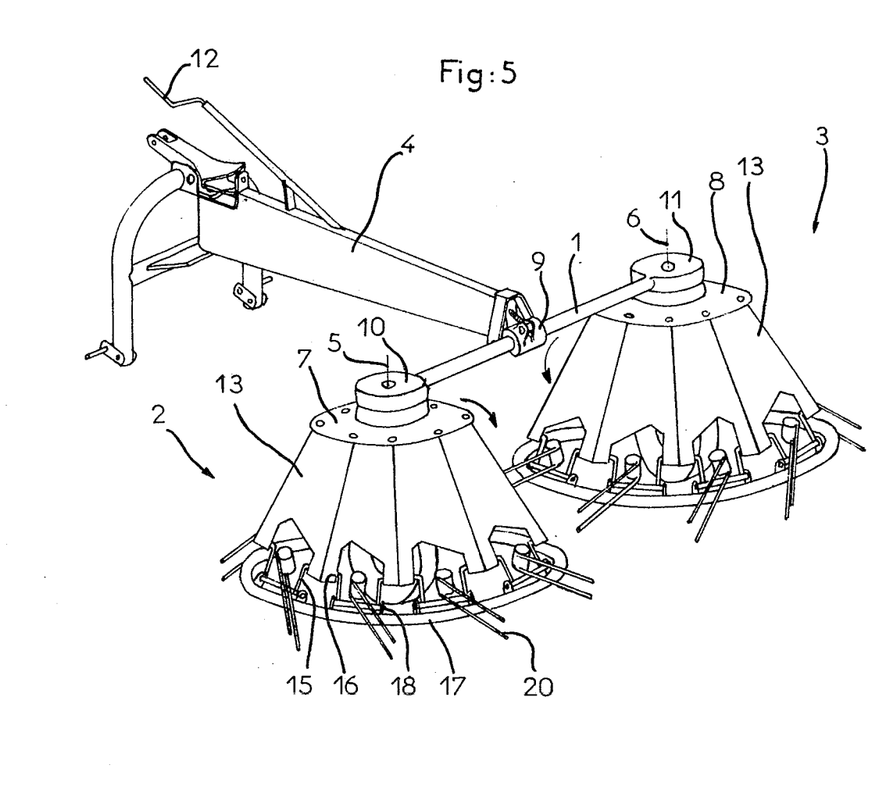
FIG. 5 represents a partial perspective view of the machine according to FIG. 4.

In the drawings, the machine as represented in FIGS. 3, 4 and 5 comprises a hollow beam 1 carrying rotors 2, 3 and capable of attachment by means of an articulated frame 4 to a driving tractor.

The rotors 2, 3 can be driven in known manner in rotation about their respective axes 5, 6 by drive elements (not shown) which extend from the power take-off shaft of the tractor to the drive hubs 7, 8 of the rotors 2, 3, passing through the gear boxes 9, 10, 11.

In general the directions of rotation of the rotors and the speeds of rotation of the rotors can be selected as desired.

In the non-limitative example of embodiment as represented in FIGS. 3, 4, and 5 the rotors are driven in such manner that their directions of rotation are convergent at the front. Moreover the inclination of the axes 5, 6 of rotation of the rotors 2, 3 in relation to the ground can be regulated from the tractor seat with the aid of the crank handle 12.

In accordance with the invention, on each rotor, push-rods 13 are articulatedly connected to the drive hub 7, 8 by articulations 14. These same push-rods are moreover articulatedly connected with cranks 15 by articulations 16. These cranks are articulatedly connected at the same time to an annular support 17 by articulations 18 and to the arms 19 carrying the tools 20, by articulations 21. The push-rods 13 are articulatedly connected to a hub 7, 8 for transposition of the annular support 17 and the tool-carrier arms 19 between a low swathing position and a higher tedding position.

In FIGS. 1, 3, 6 and 7 the tools 20, which can be forks, teeth or similar elements, occupy a position in which they can ted the crop in an effective manner. The trajectory "T" described by these tools is large and permits the tools of two adjacent rotors to overlap partially. Stops 25 placed between the tool-carrier arms 19 and the cranks 15 prevent the tools 20 from pivoting upwards about the articulations 21 of the tool-carrier arms and therefore permit of obtaining vigorous tedding of the crop, which is especially useful when the latter is soaked by the rain. Seen as in FIG. 7, the axis of the articulation 21 of the tool-carrier arm 19 forms an acute angle λ with the axis of the articulation 18 of the crank 15 on the annular support 17. This outer annular support 17 effects the connection between the different points of articulation of the cranks 15 and carries out a function of stiffening and protection. The said ring 17 thus renders the operation of the machine more certain than if the tool-carrier arms 19 were longer and articulated on a central hub.

Figure 1:
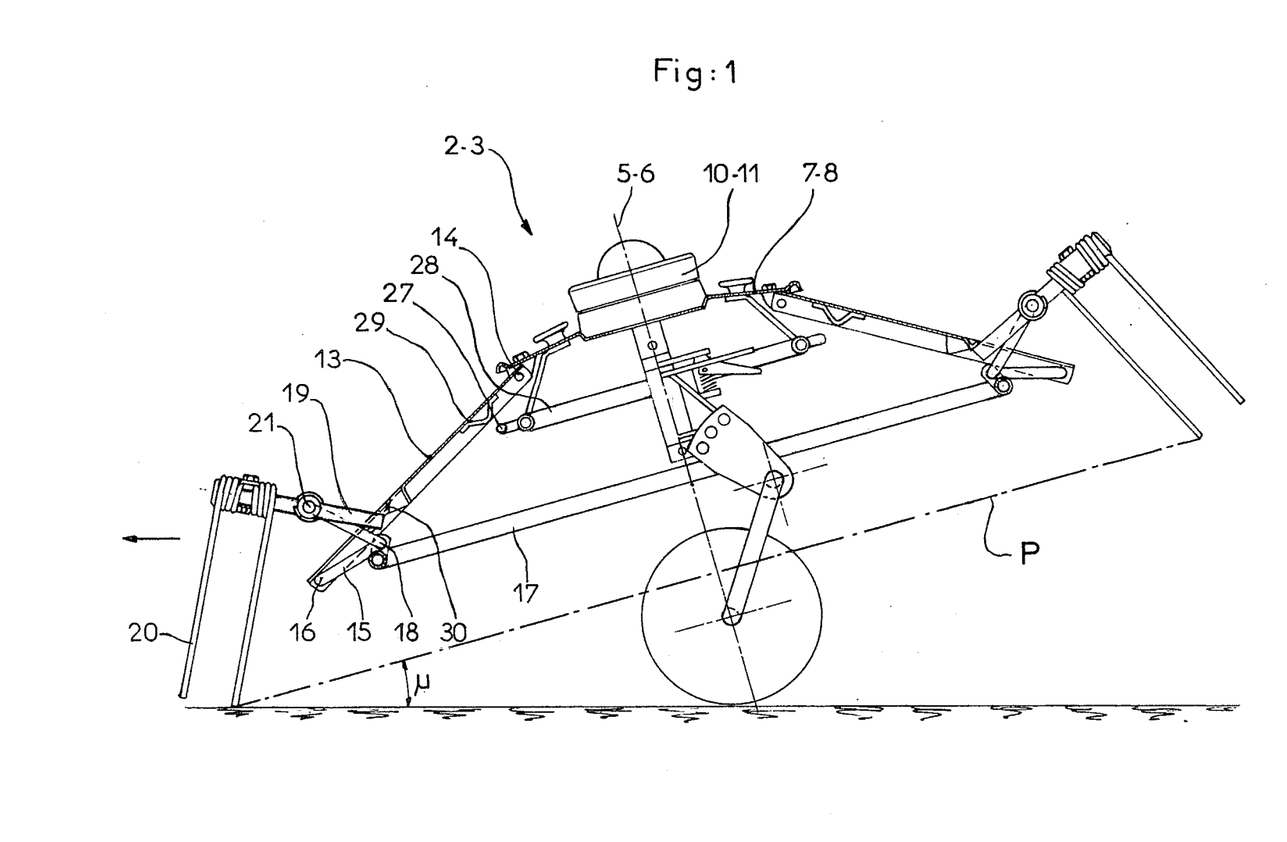
FIG. 1 represents a partial profile view of a rotor in the tedding position.

According to the invention the annular support 17 can be constituted by one single piece, as is the case in FIGS. 1 and 2. This support can also be constituted by several pieces, as is the case in FIGS. 13 and 14.

In the form of embodiment according to FIG. 13, elements 42 effect the joining and the articulations 18 of two immediately adjacent cranks 15 and form what has been commonly called the annular support 17 in the description and in the Claims. In the form of embodiment according to FIG. 14 the annular support 17 is constituted by intermediate elements 43 forming a rigid ring, after assembling with pivot pins 44. The cranks 15 are articulated about the pivot pins 44.

It will then be seen that according to an essential characteristic of the invention the annular support 17 can be displaced in height in relation to the rotation axis 5, 6 of its rotor and substantially concentrically therewith.

In FIGS. 2, 4, 5, 8 and 9 the tools 20 have been transposed by means of their tool-carrier arms 19, by pivoting of these latter about their particular articulations 21 as described above, and by pivoting of the said articulations 21 inwards and downwards, into a swathing position in which they are more inclined in relation to the ground than in their tedding position and are oriented towards the direction opposite to the direction of rotation of their respective rotors, the trajectories "$t$" described by the working tools being reduced by this transposition. The inter-axial distance 26 of the rotors has the advantage of remaining unchanged during the said transposition.

The tools 20 can be held outwards, in the position represented in solid lines in FIGS. 8 and 9, during windrowing, under the action of centrifugal force. When the rotors cease to rotate tools can be returned inwards, into the position represented in broken lines in FIG. 8, by pivoting of their tool-carrier arms 19 about the articulations 21 under the action of torsion springs 22 bearing on one side 23 upon the cranks 15 and on the other side 24 upon the tool-carrier arms 19. This feature has the advantage of substantially reducing the risk of deformation of the tools - by digging into the ground - at the front when the rotors are placed in the swathing position and when the machine is moved forward without the rotors being driven in rotation.

On the other hand this feature would be detrimental to the quality of the tedding work. Thus to ensure effective tedding, the action of the return springs 22 is neutralised by stops 25 against which the tool-carrier arms 19 bear when the tools 20 are placed in the tedding position.

In order to transpose the tools from the swathing position into the tedding position as described, the annular support 17 is displaced upwards substantially concentrically with the rotation axis 5, 6 of its rotor. During this displacement the push-rods 13 pivot the cranks 15 upwards and outwards and the tools 20 are brought by means of their tool-carrier arms 19 into the tedding position. According to a very interesting characteristic of this invention, the annular support 17 is raised under the action of centrifugal force which separates the lower ends of the push-rods 13 and the tools 20.

In FIG. 2, the push rods 13 are locked in their swathing position by the hooks 27 of a locking ring 28, which hooks are lodged in eyelets 29 of the push-rods 13.

A rotation of the locking ring 28 in relation to the axis 5, 6 of the rotor permits of freeing all the push-rods 13 of one and the same rotor from the hooks 27.

After this unlocking it is sufficient to drive the rotor in rotation, to lift the annular support 17 and therefore transpose the tools 20 from the swathing position as represented in FIG. 2 into the tedding position as represented in FIG. 1. This characteristic renders utilisation of the machine practical and attractive.

In the tedding position the axes of the articulations 16 of the push-rods 13 are placed further outwards and closer to the plane P formed by the trajectory T of the tools 20 than the axes of the articulations 18 of the cranks 15; the tool-carrier arms 19 bear against stops 30 provided on the push-rods 13. Thus in the form of embodiment according to FIG. 1 the annular support 17, the cranks 15, push-rods 13 and tool-carrier arms 19 are self-locked in the tedding position. A downward pressure upon the annular support 17 permits of lowering the latter into its swathing position when the rotors are halted.

In the form of embodiment as represented in FIGS. 10 to 12, the push rods 13 are provided with two positioning lugs 31 and 32. A flexible plate 33 made fast with the drive hub 7 comprises positioning holes 34 in which the lugs 31, 32 are successively lodged. This plate 33 maintains the push-rods 13 in the position corresponding to windrowing when the lugs 31 are engaged in the positioning holes 34 and in the position corresponding to tedding when it is the lugs 32 which are engaged in the positioning holes 34.

Thus to pass from the swathing position into the tedding position it is necessary to free the lugs 31 and lodge the lugs 32 in the positioning holes 34. To do this it is sufficient to disengage the flexible plate 33 by a downwardly directed pressure F exerted upon the base piece 35 and to rotate the rotors at a sufficient speed so that the push-rods 13 come into position under the action of centrifugal force.

Conversely to pass from the tedding position into the swathing position it is necessary to free the lugs 32 and lodge the lugs 31 in the positioning holes 34. To do this it is sufficient to disengage the flexible plate 33 by a downwardly directed pressure F exerted upon the base piece 35 and to stop or at least reduce the rotation of the rotors. The push rods 13 thus freed descend into the swathing position under the action of the weight of the annular support 17, the cranks 15, the tools 20 and their tool-carrier arms 19. It will be noted that in this form of embodiment in the tedding position (FIG. 11) the axes of the articulations 16 of the push rods 13 are more remote from the plane P formed by the trajectory T of the tools 20 than in the form of embodiment as represented in FIG. 1.

In both examples of embodiment of the locking as described above, the height blocking of the annular support 17 can advantageously be effected by the locking of only two push-rods 13 on each rotor.

In this form of embodiment the control of the changes of position of the tools can be synchronised with the regulation of the angle $\mu$ of tilt of the rotors.

Thus, by reducing the tilt angle $\mu$, with the aid of the threaded crank handle 12, to pass from the tedding position into the swathing position, one pivots the transverse rotor-carrier beam 1 about the axis 36 in relation to the frame 4. During this pivoting, on each rotor 2, 3 the feeler 37 of a rocker 38 articulated on a lug 39 fast with the frame 4 moves to the rear along a cam 40 fast with the frame 4.

When the tilt angle corresponding to windrowing is almost reached, the boss 41 of the cam 40 acts upon the feeler 37 of the rocker 38 so that the latter presses upon the base piece 35. Under the action of this pressure the flexible plate 33 descends and frees the lugs 32. The push-rods then descend into the position corresponding to windrowing as described above, without any further manoeuvre of regulation of the tools.

Likewise when the tilt angle $\mu$ of the rotors is increased with the aid of the threaded crank handle 12 to return into the tedding position, the feeler 37 of the rocker 38 moves forward along the cam 40. When the said feeler 37 passes beneath the boss 41 of the cam, the rocker 38 depresses the base piece 35 and the flexible plate 33. The latter liberates the lugs 31 and permits the push-rods to depart into the position corresponding to tedding, as described above, under the action of centrifugal force, without any further manoeuvre of regulation of the tools.

Thus in accordance with this last form of embodiment according to the invention, several rotors of a hay-making machine of reliable operation can be transposed simultaneously and in an attractive manner into two quite distinct positions permitting the machine to carry out tedding and windrowing work of excellent quality at the same time, and this transposition can be effected from the driver's seat.

What is claimed is:

1. An agricultural hay-making machine for both tedding and windrowing, comprising at least two rotors, means mounting said rotors on said machine for rotation, each rotor comprising tool-carrier arms articulatedly connected to cranks which cranks are articulatedly connected between an annular support and push-rods, the push-rods being articulatedly connected to a hub for transposition of the annular support and the tool-carrier arms between a low swathing position and a higher tedding position.

2. A machine according to claim 1, characterised in that the annular support is displaced in height substantially concentrically with the axis of rotation of its rotor for the transposition of the latter from the swathing position into the tedding position and from the tedding position into the swathing position.

3. A machine according to claim 2, characterised in that the articulations of the push-rods, of the cranks, of the annular support and the tool-carrier arms are disposed so that for the transposition of the rotors from the swathing position into the tedding position the annular support is displaced upwards under the action of centrifugal force which tends to separate the push-rods, the cranks and the tool-carrier arms from the axis of rotation of the rotor, during the rotation of the latter.

4. A machine according to claims 1, characterised in that all the axes of the articulations of the tool-carrier arms form an acute angle $\lambda$ with thee axes of the articulations of their respective cranks on the annular support.

5. A machine according to claim 1, characterised in that a locking device ensures the height locking of the annular support during windrowing.

6. A machine according to claim 5, characterised in that the control of the locking and unlocking device for the height of the annular support is synchronised with the control of the regulation of the angle of tilt of the rotors.

7. A machine according to claim 6, characterised in that the annular support is unlocked in height by an unlocking device operated as a result of the rotation of the rotor carrier beam in relation to the frame, caused by the regulation of the tilt angle from the tedding position into the swathing position and from the swathing position into the tedding position.

8. A machine according to claim 7, characterised in that the regulation of the tilt angle of the rotors and of the locking and unlocking device for the height of the annular support is obtained by one and the same threaded crank handle which extends towards the front in such manner that it is accessible from the tractor driver's seat.

9. A machine according to claim 5, characterised in that the height locking of the annular support is ensured by the locking of the push-rods at a determined distance from the axis of rotation of their respective rotor.

10. A machine according to claim 1, characterised in that in the tedding position the tool-carrier arms are locked by stops.

11. A machine according to claim 1, characterised in that the annular support is constituted by one single element.

12. A machine according to claim 1, characterised in that the annular support is constituted by several elements effecting the connection between the cranks.

13. A machine according to claim 1, characterized in that each of the cranks has an elbow and a pair of legs disposed one on each side of the elbow, the legs of each crank being disposed at an angle to each other, the free end of each leg and the elbow of the crank defining three points of connection on the crank, the tool-carrier arms being connected to one said point of connection, the outer ends of the push rods being articulatedly connected to another said point of connection, and the annular support being articulatedly connected to the remaining point of connection of each crank.

14. A machine according to claim 13, in which said crank elbows are articulatedly connected to said annular member.

15. A machine according to claim 1, the axes of articulated connection of said push rods to said hub lying in a plane perpendicular to the axis of rotation of the associated said rotor.

16. A machine according to claim 15, characterized in that the annular support is concentric with said axis.

17. A machine according to claim 1, the push-rods being articulatedly connected to a hub of the rotor, the axes of articulated connection of said push-rods to said hub lying in a plane perpendicular to the axis of rotation of the associated said rotor.

18. A machine according to claim 17, characterized in that the annular support is concentric with said axis.

19. An agricultural hay-making machine for both tedding and windrowing, comprising at least two rotors, means mounting said rotors on said machine for rotation about axes displaced from the horizontal, a plurality of outwardly extending push-rods carried by each rotor, tines carried by arms and having ends connected to the arms and free ends, and means mounting said tines for adjustive movement between a tedding position in which said tines extend downwardly from said connected ends to said free ends at a first angle to the horizontal when tedding, and a windrowing position in which said connected ends are more closely adjacent the ground when windrowing than in said tedding position and said tines are disposed at a second angle to the horizontal when windrowing which is substantially less than said first angle, said tines when windrowing being inclined to the rear from the direction of rotation of the rotor, the free ends of the tines when windrowing moving, by said adjustive movement, in a smaller circle than when tedding, each of said tines rotating substantially in a single plane while tedding and substantially in a single plane while windrowing, said tine mounting means comprising cranks articulatedly connected to said arms and to said annular support and to said push-rods.

20. A machine according to claim 19, characterized in that each of the cranks has an elbow and a pair of legs disposed one on each side of the elbow, the legs of each crank being disposed at an angle to each other, the free end of each leg and the elbow of the crank defining three points of connection on the crank, the arms being connected to one said point of connection, the outer ends of the push-rods being articulatedly connected to another said point of connection, and the annular support being articulatedly connected to the remaining point of connection of each crank.

21. A machine according to claim 20, in which said crank elbows are articulatedly connected to said annular member.

* * * * *